3,743,615
Patented July 3, 1973

3,743,615
FAST DRY REFINISH PAINTS
Andrew Edward Yethon, Otterburn Heights, Quebec, Canada, assignor to Canadian Industries Limited, Montreal, Quebec, Canada
No Drawing. Filed May 15, 1972, Ser. No. 253,436
Claims priority, application Canada, May 20, 1971, 113,555
Int. Cl. C09d 3/64
U.S. Cl. 260—22 CB    10 Claims

ABSTRACT OF THE DISCLOSURE

A fast dry refinish composition which is a copolymer formed from vinyl or acrylic monomers and an acrylate-modified alkyd. The acrylate-modified alkyd is prepared by first forming a hydroxyl group-containing ester by ester exchange reactions between a polyol, a drying oil and a high boiling alkyl acrylate such as laurylmethacrylate, and then reacting the hydroxyl group-containing ester with an organic dibasic acid such as phthalic acid. The composition has the property of fast air drying and is suitable for refinish applications.

---

This invention relates to a coating composition and to a process for the manufacture of the same.

Coating compositions having fast drying times find application in the refinishing of metal panels such as used in automotive vehicles. It is necessary that these coating compositions dry quickly in air to give coatings having properties, such as gloss, similar to the properties of the original coatings. The air drying property of refinish compositions is usually attained by the inclusion of a drying oil ingredient in the compositions. This can be present as an oil-modified alkyd. It is also known to employ air drying coating compositions composed of a copolymer of a drying oil-modified alkyd and a linear polyester containing acrylate or methacrylate end groups. However, coatings formed from alkyd acrylic copolymers are found to have unsatisfactory solvent resistance. There is thus need for a fast drying refinish paint having a balance of useful properties.

It has now been found that a fast air drying coating composition having a good balance of properties can be prepared by using a copolymer having an alkyd ingredient formed by reacting an organic dibasic acid or anhydride with a hydroxyl group-containing ester formed by ester exchange reactions between a polyol, a drying oil and a high boiling alkyl acrylate. The alkyd ingredient is subsequently reacted with vinyl and/or acrylic monomers to form a fast, air drying coating resin.

Thus, the main object of the present invention is to provide a fast drying coating composition. Additional objects will appear hereinafter.

The coating composition of this invention comprises the reaction product of 30% to 70% by weight of an oil-modified alkyd (I) prepared by the steps of (1) subjecting a drying oil to an ester exchange reaction with a polyol in proportions such as to form a hydroxyl group-containing partial ester comprising polyol and drying oil acid residues, the reaction taking place at 230° C. to 240° C. in the presence of an ester exchange catalyst, (2) subjecting the product of the reaction of (1) to an additional ester exchange reaction with an alkyl acrylate having 6 to 18 carbon atoms in the alkyl moiety at 230° C. to 240° C. in the presence of an ester exchange catalyst, the alkyl acrylate component comprising 5 to 33 mole percent of the drying oil component, and (3) condensing the reaction product of step (2) with an organic dibasic acid at a temperature in the range 190° C. to 230° C., to form an alkyd, said alkyd having an oil length of 40% to 65% and an excess of hydroxyl ranging up to about 30% of that required theoretically to react with the carboxyl content, and 70% to 30% by weight of a member (II) selected from the group consisting of vinyl group-containing monomers, monomeric alkyl acrylates and mixtures of these, the reaction of (I) and (II) taking place in the presence of a free radical producing catalyst.

Polyols suitable as ingredients of the alkyd component of the coating composition include ethylene glycol, glycerol, pentaerythritol, trimethylolethane, trimethylolpropane, etc.

The drying oils suitable for use as ingredients of the alkyd component include the well known articles of commerce which are converted by the action of oxygen into hard dry resinous materials. These oils are mainly triglycerides having a relatively high degree of unsaturation. The oils usually have 18 carbon atoms in the straight chain structure. Common oils of this class are linseed, tung, soybean, dehydrated castor, oiticica, perilla and safflower. Included within the definition of drying oils are the so-called semi-drying oils having iodine values lying between 90 and 130. Non-drying oils such as castor have iodine values lying below about 90. By "iodine value" is meant the number of grams of iodine or equivalent halogen absorbed by 100 grams of the oil.

The alkyd acrylate ingredient of the alkyd having 6 to 18 carbon atoms in the alkyl moiety include both alkyl acrylates and alkyl methacrylates such as laurylmethacrylate, stearylmethacrylate, hexylmethacrylate, 2-ethylhexyl-acrylate and decyloctylmethacrylate.

The catalysts suitable for catalyzing the ester exchange reaction include lead oxide, lead naphthenate, calcium oxide, calcium naphthenate, barium oxide, barium naphthenate and lithium ricinoleate. The catalyst is employed in amounts in the range of 0.01% to 0.10% by weight of the alkyd component.

The organic dibasic acids suitable is ingredients of the alkyd component include aromatic dibasic acids such as phthalic anhydride, phthalic acid and isophthalic acid, and aliphatic dibasic acids such as maleic anhydride, maleic acid, fumaric acid, adipic acid, azelaic acid, succinic acid and sebacic acid.

The condensation reaction between the organic dibasic acid and the partial ester of the polyol is continued preferably until the condensation product has an acid number which is at least 20 units greater than the acid number at point of gelation. The acid number is the number of milligrams of potassium hydroxide required to neutralize 1 gram of the material.

The vinyl group-containing monomer ingredients reactive with the alkyd include styrene, vinyl toluene and vinyl acetate. The alkyl acrylate monomer ingredients reactive with the alkyd include methyl acrylate, ethyl acrylate, propyl acrylate, butyl acrylate, methyl methacrylate, ethyl methacrylate, propyl methacrylate, butyl methacrylate, acrylonitrile, methacrylonitrile, etc.

The free radical-producing catalysts employed to catalyze the reaction between the vinyl or acrylic monomer and the alkyd include benzoyl peroxide, tertiary butyl peroxides, tertiary butyl peroxybenzoate, etc. This catalyst is employed in amounts in the range 0.05% to 5.0% by weight of the coating composition.

In a preferred procedure for the preparation of the composition of this invention, the drying oil and polyol ingredients and ester exchange catalyst are mixed and maintained at a temperature of 230° C. to 240° C. for about 1 hour. The mixture is then cooled to about 180° C. and the alkyl acrylate ingredient added. The ester exchange reaction is continued at 230° C. to 240° C. for an additional 30 minutes to 1 hour. It has been found that under the conditions of the ester exchange reaction very little homopolymerization of the alkyl acrylate ingredient takes place. The mixture is then cooled to 180° C. and the organic dibasic acid ingredient and a solvent such as toluene is added. The mixture is then heated at 190° C. to 230° C. and the water formed during the condensation reaction is distilled off. The condensation reaction is continued until the alkyd product has the desired acid number. Normally the acid number of the alkyd will be at least 20 acid number units greater than the acid number at which the material gels.

The alkyd prepared by the procedure described above is then reacted with vinyl and/or acrylic monomers in the presence of a free radical-producing catalyst. This reaction is preferably carried out by heating the alkyd to a temperature in the range 135° C. to 140° C. and adding over a period of about 3 hours the acrylic and/or vinyl monomer and the catalyst. After all the ingredients have been added the reaction mixture is maintained at 135° C. to 145° C. until the conversion as measured by the determination of total solids is greater than 95%. The product is then thinned to about 50% solids with a suitable solvent such as aromatic naphtha. The composition before application as a coating requires the addition of metal driers such as the naphthenate or octoate salts of cobalt, lead, calcium, zinc, zirconium manganese or cerium, used alone or as mixtures. The proportion of drier employed will be chosen to match the composition and pigment used. Illustrative ranges, expressed as metal content percentage based on drying oil ingredient are cobalt 0.1% to 0.01% by weight, lead 2.0% to 0.005% by weight, manganese 0.1% to 0.005% by weight, calcium 0.2% to 0.0005% by weight. The coating composition will normally be pigmented with suitable pigment ingredients to give the desired colour.

The product has the desirable property of fast air drying and is suitable for refinishing applications.

The invention is additionally illustrated by the following examples but its scope is not limited to the embodiments shown therein. Unless otherwise stated, parts and percentages are expressed on a weight basis.

EXAMPLE 1

Into a 3 liter flask fitted with thermometer and stirrer were placed the following ingredients

| | Parts |
|---|---|
| Soybean oil | 861 |
| Technical grade pentaerythritol | 228 |
| Litharge | 0.6 |

The mixture was maintained at a temperature of 230° C. to 235° C. for a period of 1 hour to allow an ester exchange reaction between the soybean oil and the pentaerythritol to take place.

The reaction mixture was then cooled to 180° C. and 83 parts of laurylmethacrylate added. The temperature of the reaction mixture was then raised to 220° C. to 230° C. and maintained at this temperature for 30 minutes, thus continuing the ester exchange reaction.

The reaction mixture was then cooled to 180° C. and the flask equipped with reflux condenser having a Dean-Stark trap. The following ingredients then were added.

| | Parts |
|---|---|
| Phthalic anhydride | 372 |
| Toluene | 45 |

The condensation reaction was continued at a temperature of 190° C. to 220° C. the water product of the reaction being collected in the Dean-Stark trap. The reaction was stopped when the alkyd product had an acid number of 30.

100 parts of the above alkyd were placed in a 1 liter flask fitted with a stirrer, a thermometer and a reflux condenser. The flask was heated to 135° C. and the following ingredients were added over a 3-hour period.

| | Parts |
|---|---|
| Additional alkyd, as above | 131 |
| Styrene | 98 |
| Methylmethacrylate | 28 |
| Acrylonitrile | 14 |
| Tertiary butyl peroxide | 4.5 |

During addition of the ingredients the temperature of the mixture was maintained in the range 135° C. to 140° C. After addition of the ingredients was completed the reaction mixture was maintained at a temperature of 135° C. until the conversion, as measured by total solids determination, was greater than 95%. The material was then thinned to 50% total solids in aromatic naphtha solvent (B.P. 130°–200° C.). The constants of the resin solution were

| | |
|---|---|
| Acid number | 17.6 |
| Gardner-Holt viscosity (5.5 poises) | T |
| Color | 6 |

EXAMPLE 2

The following materials were placed in a 3 liter flask of the type described in Example 1

| | Parts |
|---|---|
| Soybean oil | 772 |
| Technical pentaerythritol | 230 |
| Litharge | 0.4 |

The mixture was heated at 230° C. to 235° C. for 1 hour. At the end of the 1 hour period 167 parts of laurylmethacrylate were added to the reaction mixture. The heating at 230° C. to 235° C. was continued for an additional 30 minutes.

The reaction mixture was then cooled to about 180° C. and 375 parts phthalic anhydride and 45 parts of toluene were added. The reaction mixture was then heated at 210° C. to 220° C., collecting the water produced in the condensation reaction in a Dean-Stark trap. Heating was continued until the alkyd product had an acid number of 35.

250 ml. of toluene were placed in a 1 liter flask fitted with thermometer, stirrer and reflux condenser. The toluene was heated to reflux temperature and over a period of 3 hours the following materials were added to the flask

| | Parts |
|---|---|
| Alkyd as above | 253 |
| Styrene | 82.8 |
| Methylmethacrylate | 77.2 |
| Tertiary butyl peroxybenzoate | 5.0 |

After addition was complete the reaction mixture was heated at reflux temperature until the conversion was greater than 95%. The constants of the resin solution were as follows:

| | |
|---|---|
| Total solids (percent) | 59.6 |
| Gardner-Holt viscosity (2.00 poises) | H |
| Color | 3 |
| Acid number | 21.0 |

EXAMPLE 3

The following materials were placed in a 5 liter flask fitted with thermometer, stirrer and reflux condenser.

| | Parts |
|---|---|
| Linseed oil | 868 |
| Technical pentaerythritol | 272 |
| Litharge | 0.7 | and heated at 230° C. to 235° C. for 1 hour. Laurylmethacrylate (40 parts) was then added to the reaction mixture and heating was continued for an additional 30 minutes. The following materials were then added to the reaction mixture and heated at reflux temperature for 30 minutes.

| | Parts |
|---|---|
| Phthalic anhydride | 803 |
| Ethylene glycol | 115 |
| Toluene | 172 |

A fractionating column and water separator were then fitted to the flask. Water was then removed from the reaction mixture until the acid number reached 50.

In a 2 liter flask fitted with stirrer, thermometer and reflux condenser were placed 566 parts of the alkyd above. Over a period of 2½ hours the following mixture was added to the flask, the reaction temperature being maintained at 135° C. to 140° C.

| | Parts |
|---|---|
| Styrene | 147 |
| Methylmethacrylate | 42 |
| Acrylonitrile | 21 |
| Tertiary butylperoxide | 5 |

After addition of the above materials was complete 300 parts of toluene was added slowly to the reaction so as to maintain the temperature. The reaction was continued until the conversion was greater than 95%. The reaction mixture was diluted to 50% total solids by adding a mixture of toluene and n-butanol so that the final solvent composition was toluene/n-butanol 90/10. The constants of the resin solution were:

| | |
|---|---|
| Gardner Holt viscosity (17.6 poises) | Y |
| Acid number | 33.3 |
| Color | 6 |

EXAMPLES 4–8

Coating compositions were prepared employing the procedure of Examples 1 to 3. The compositions were pigmented with rutile or aluminum and sprayed on steel panels. The rutile pigment was employed at a pigment/binder ratio of 1.0/1.63 whereas the aluminum pigment was employed at a pigment/binder ratio of 1.0/17.5. The drier employed in Examples 4–7 was a mixture of naphthenates of cobalt, manganese, lead and calcium, the proportion as metal weight percent of resin solids being: cobalt—0.14%; manganese—0.009%; lead—0.56% and calcium—0.102%. In Example 8 naphthenates of cobalt, manganese and lead were employed; cobalt—0.058%; manganese—0.028%; lead—0.582%. The dustfree time (DFT) tack free time (TFT), water spotting after 24 hours, gasoline resistance after 24 hours and tape print resistance were measured. The compositions and physical characteristics are shown in Table I.

EXAMPLE 9

The following materials were placed in a 3 liter flask fitted with stirrer, reflux condenser and thermometer.

| | Parts |
|---|---|
| Soybean oil | 861 |
| Technical pentaerythritol | 228 |
| Litharge | 0.6 |

Heat was applied to the flask and the contents maintained at 230° C. to 235° C. for 1 hour. The reaction mixture was then cooled to 180° C. and 83 parts of laurylmethacrylate added. The temperature of the reaction mixture was then raised and maintained at 220° C. to 235° C. for ½ hour. After cooling the reaction mixture to 180° C. the following materials were added.

| | Parts |
|---|---|
| Phthalic anhydride | 372 |
| Toluene | 45 |

Heating of the reaction mixture was continued, collecting the water distilled over in a Dean-Stark trap, until the acid number of the alkyd product reached 25.

TABLE I

| Example | Alkyd composition | Vinyl-acrylic composition | Alkyd/vinyl acrylic | Final G–H viscosity | Final acid number | Pigment | DFT | TFT | Water spotting, 24 hrs. | Gasoline resistance, 24 hrs. | Tape print resistance, 24 hrs. |
|---|---|---|---|---|---|---|---|---|---|---|---|
| 4 | PE/PA/SO/LMA 15.2/24.8/57.4/5.6 | S/MMA/AN 70/20/10 | 60/40 | W (10.7 poises) | 19.3 | Rutile | 30 min. | 60 min. | Good | Excellent | Excellent. |
| 5 | PE/PA/SO/LMA 15.2/24.8/57.4/5.6 | S/MMA/AN 70/20/10 | 70/30 | U (6.3 poises) | 14.5 | do | 45 min. | >4 hrs. | do | Good | Good. |
| 6 | PE/PA/SO/LMA 15.2/24.8/57.4/5.6 | S/MMA/AN 70/20/10 | 60/40 | V (8.8 poises) | 8.1 | do | 60 mon. | 3 hrs. | do | Excellent | Do. |
| 7 | PE/PA/SO/LMA 15.1/24.7/60.4/2.8 | S/MMA/AN 70/20/10 | 70/30 | V (8.8 poises) | 12.8 | do | 65 min. | 3 hrs. | do | do | Do. |
| 8 | PE/PA/SO/LMA 15.1/24.7/60.4/2.8 | S/MMA/AN 70/20/10 | 60/40 | T (5.5 poises) | 17.6 | Aluminum | 40 min. | 1 hr., 15 min. | Excellent | Good | Excellent. |

NOTE.—PE=Pentaerythritol; PA=Phthalic anhydride; SO=Soyabean oil; LMA=Laurylmethacrylate; S=Styrene; MMA=Methylmethacrylate; AN=Acrylonitrile.

Into a 1 liter flask fitted with stirrer, thermometer and reflux condenser were placed 164 parts of xylene. The xylene was heated to reflux temperature and over a 3 hour period the following mixture was added to the refluxing xylene.

| | Parts |
|---|---|
| Alkyd product as prepared above | 155 |
| Styrene | 70 |
| Methylmethacrylate | 20 |
| Acrylonitrile | 10 |
| Tertiary butyl peroxide | 2 |

After addition was complete the reaction mixture was maintained at 135° C. to 145° C. until the conversion, as determined by total solids determination, was greater than 95%. The material was then thinned to 50% total solids in xylene. The constants of the resin solution were

| | |
|---|---|
| Acid number | 14.6 |
| Gardner-Holt viscosity (2.50 poises) | J |

The above resin solution was pigmented with aluminum at a pigment/binder ratio of 1.0/17.9, and a drier mixture containing cobalt, lead and maganese naphthenates as employed in Example 8 added in amount equal to 3.9% of resin solids. The pigmented material was sprayed on steel panels and the tack free time and gloss measured. The values are shown in Table II.

EXAMPLE 10

In this example the same ingredients as in Example 9 were employed but the laurylmethacrylate ingredient did not form a component of the alkyd. Instead, the laurylmethacrylate was mixed with the alkyd after formation of the latter. The mixture of alkyd and laurylmethacrylate then was mixed with the styrene, methylmethacrylate and acrylonitrile and reacted in the presence of the peroxide catalyst. The final product of Example 10 thus was a physical blend of acrylic polymer (containing laurylmethacrylate) and alkyd. In distinction, the final product of Example 9 involves chemical combination of alkyd and acrylic components.

The preparation was carried out as follows.

The following materials were placed in a 3 liter flask fitted with stirrer, reflux condenser and thermometer.

| | Parts |
|---|---|
| Soybean oil | 861 |
| Technical pentaerythritol | 228 |
| Litharge | 0.6 |

Heat was applied to the flask and the contents maintained at 230° C. to 235° C. for 1 hour. The reaction mixture was then cooled to 180° C. and the following materials were added.

| | Parts |
|---|---|
| Phthalic anhydride | 372 |
| Toluene | 45 |

Heating of the reaction mixture was continued, collecting the water distilled over a Dean-Stark trap, until the acid number of the alkyd product reached 25. The product was then cooled to room temperature and 83 parts of laurylmethacrylate were added.

Into a 1 liter flask fitted with stirrer, thermometer and reflux condenser were placed 164 parts of xylene. The xylene was heated to reflux temperature and over a period of 3 hours the following mixture was added to the refluxing xylene.

| | Parts |
|---|---|
| Mixture of alkyd and laurylmethacrylate as prepared above | 155 |
| Styrene | 70 |
| Methylmethacrylate | 20 |
| Acrylonitrile | 10 |
| Tertiary butyl peroxide | 2 |

After addition was complete the reaction mixture was maintained at 135° C. to 145° C. until the conversion, as determined by total solids determination, was greater than 95%. The material was then thinned to 50% total solids in xylene. The constants of the resin solution were

| | |
|---|---|
| Acid number | 13.2 |
| Gardner-Holt viscosity (1.25 poises) | E |

The resin solution was pigmented with aluminum at a pigment/binder ratio of 1.0/17.9, and a drier mixture containing cobalt, lead and manganese naphthenates as employed in Example 8 added in amount equal to 3.9% of resin solids. The pigmented material was sprayed on steel panels and the tack free time and gloss measured. The values are shown in Table II. It can be seen that the composition of the invention, in which the laurylmethacrylate is a component of the alkyd, possesses a lower tack free time and a higher gloss than the composition in which the laurylmethacrylate is added after formation of the alkyd.

TABLE II

| Example: | Tack-free time | Gloss 60° |
|---|---|---|
| 9 | 45 minutes | 80 |
| 10 | 6 hours, 15 minutes | 50 |

What we claim is:
1. A coating composition comprising the reaction product of 30% to 70% by weight of an oil modified alkyd (I) prepared by the steps of
   (1) subjecting a triglyceride drying oil to an ester exchange reaction with a polyol in proportions such as to form a hydroxyl group-containing partial ester comprising polyol and drying oil acid residues, the reaction taking place at 230° C. to 240° C. in the presence of an ester exchange catalyst,
   (2) subjecting the product of the reaction of step (1) to an additional ester exchange reaction with an alkyl acrylate having 6 to 18 carbon atoms in the alkyl moiety at 230° C. to 240° C. in the presence of an ester exchange catalyst, the alkyl acrylate component comprising 5 to 33 mole percent of the drying oil component, and
   (3) condensing the reaction product of step (2) with an organic dibasic acid at a temperature in the range 190° C. to 230° C. to form an alkyd, said alkyd having an oil length of 40% to 65% and an excess of hydroxyl ranging up to about 30% of that required theoretically to react with the carboxyl groups of the dibasic acid,
and 70% to 30% by weight of a member (II) selected from the group consisting of monomers containing a single vinyl group and mixtures thereof, the reaction of (I) and (II) taking place in the presence of a free-radical-producing catalyst.

2. A coating composition as claimed in claim 1 wherein the drying oil ingredient is selected from the group consisting of linseed, tung, soybean, dehydrated castor, oiticica, perilla and safflower oils.

3. A coating composition as claimed in claim 1 wherein the polyol ingredient is selected from the group consisting of ethylene glycol, glycerol, pentaerythritol, trimethylolethane and trimethylolpropane.

4. A coating composition as claimed in claim 1 wherein the alkyl acrylate ingredient of the alkyd is selected from the group consisting of laurylmethacrylate, stearylmethacrylate, hexylmethacrylate, 2-ethylhexylacrylate, and decyl-octylmethacrylate.

5. A coating composition as claimed in claim 1 wherein the ester exchange catalyst is selected from the group consisting of lead oxide, lead naphthenate, calcium oxide, calcium naphthenate, barium oxide, barium naphthenate and lithium ricinoleate.

6. A coating composition as claimed in claim 1 wherein the ester exchange catalyst is employed in an amount of 0.01% to 0.10% by weight of the alkyd.

7. A coating composition as claimed in claim 1 wherein the organic dibasic acid ingredient is selected from the group consisting of phthalic anhydride, phthalic acid and isophthalic acid.

8. A coating composition as claimed in claim 1 wherein ingredient (II) reactive with the alkyd is selected from the group consisting of styrene, vinyltoluene, vinylacetate, methylacrylate, ethylacrylate, propylacrylate, butylacrylate, methylmethacrylate, ethylmethacrylate, propylmethacrylate, butylmethacrylate, acrylonitrile, methacrylonitrile and mixtures of these.

9. A coating composition as claimed in claim 1 wherein the free radical-producing catalyst employed to catalyze the reaction between (I) and (II) is selected from the group consisting of benzoyl peroxide, tertiary butyl peroxides and tertiary butyl peroxybenzoate.

10. A coating composition as claimed in claim 1 wherein the free radical-producing catalyst is employed in an amount of 0.05% to 5.0% by weight of the coating composition.

References Cited

UNITED STATES PATENTS

| | | | |
|---|---|---|---|
| 3,468,826 | 9/1969 | McWhorter et al. | 260—22 M |
| 3,463,749 | 8/1969 | Taft | 260—22 CB |
| 3,350,335 | 10/1967 | Silver | 260—22 CB |

FOREIGN PATENTS

| | | | |
|---|---|---|---|
| 1,017,478 | 1/1966 | Great Britain | 260—22 CB |

DONALD E. CZAJA, Primary Examiner

RONALD W. GRIFFIN, Assistant Examiner

U.S. Cl. X.R.

117—132 B, 161 K; 260—23 P